United States Patent [19]
Masuda

[11] Patent Number: 5,971,782
[45] Date of Patent: Oct. 26, 1999

[54] CONNECTOR WITH A STEERING ANGLE SENSOR AND COLUMN STRUCTURE USING THE SAME

[75] Inventor: Hiromi Masuda, Shizuoka, Japan

[73] Assignee: Yazaki Corporation, Tokyo, Japan

[21] Appl. No.: 08/917,677

[22] Filed: Aug. 26, 1997

[30] Foreign Application Priority Data

Aug. 26, 1996 [JP] Japan .................................. 8-224180

[51] Int. Cl.⁶ .................................................. H01R 35/04
[52] U.S. Cl. ............................................. 439/164; 439/488
[58] Field of Search .............................. 439/164, 15, 488

[56] References Cited

U.S. PATENT DOCUMENTS 5,611,704  3/1997  Kamizono et al. ..................... 439/164

FOREIGN PATENT DOCUMENTS 5254446  10/1993  Japan .
 667207   9/1994  Japan .

Primary Examiner—Gary F. Paumen
Attorney, Agent, or Firm—Sughrue, Mion, Zinn, Macpeak & Seas, PLLC

[57] ABSTRACT

A connector with a steering angle sensor includes a steering roll connector in which an inner cylinder as a rotating body is provided inside an outer cylinder concentrically therewith, a spiral cable is stored between the outer and inner cylinders, and one end of the cable is supported on the outer cylinder while the other end of the cable is supported on the inner cylinder. A disk is fixed on the inner cylinder concentrically therewith. A plurality of slits are circumferentially formed in an outer edge portion of the disk. A sensor portion including a light receiving unit and a light emitting unit which are disposed so as to be opposite to each other through the outer edge portion of the disk is provided in a column switch.

12 Claims, 4 Drawing Sheets

CONNECTOR WITH A STEERING ANGLE SENSOR AND COLUMN STRUCTURE USING THE SAME

BACKGROUND OF THE INVENTION

The present invention relates to an improvement in a connector with a steering angle sensor and an improvement in a steering column structure using the same, in which a steering angle sensor is integrated with a steering roll connector (SRC) which is a cable-type electric connection device.

An SRC by which electric signals can be transmitted to a squib on a steering wheel with a high reliability is adopted particularly in vehicles mounted with air-bags. On the other hand, in four-wheel steering cars, so-called steering angle proportional control is performed for steering rear wheels in the reverse phase at a low speed range and in the same phase at a middle or high speed range in proportion to a steering angle. For this control, a steering angle sensor for detecting the steering angle is mounted on the four-wheel steering cars.

FIG. 4 is a sectional view of a conventional steering column portion provided with an SRC and a steering angle sensor, and FIG. 5 is a perspective view of a slit plate of the steering angle sensor. A turn signal and head lamp switch lever 3 and a wiper control switch lever 5 are provided in the outer circumference of a steering column switch (column switch) 1 through a steering shaft. An SRC 7 is provided on the upper side of the column switch 1 (on the upper side of FIG. 4). In the SRC 7, an inner cylinder 11 as a rotating body is provided in the inside of an outer cylinder 9 as a fixed body concentrically therewith. A not-shown cable is stored spirally in an annular storage chamber formed between the outer cylinder 9 and the inner cylinder 11. One end of the cable is supported on the outer cylinder 9 while the other end is supported on the inner cylinder 11. The cable supported on the inner cylinder 11 is led out as a wire harness, and connected to a squib (an electric heater wire charged with a very small amount of explosive) on a steering wheel.

In the thus configured SRC 7, electricity can be supplied to the rotating body (steering wheel) with a higher reliability than that in an electric connection device of sliding contact type in which instantaneous interruption of electric service is produced in the sliding portion.

On the other hand, a steering angle sensor 13 is provided on the lower side of the column switch 1 (on the lower side of FIG. 4). The steering angle sensor 13 is constituted by a slit plate 17 having a plurality of slits 15 (see FIG. 5) provided in its outer edge portion, and a sensor portion 19 holding the outer edge portion of this slit plate 17 from its upper and lower sides. In the steering angle sensor 13, the slit plate 17 is attached to the steering shaft so that the slit plate 17 rotates with the steering shaft, while the sensor portion 19 is fixed to the column switch 1. In the sensor portion 19, a not-shown light emitting means such as a light-emitting diode and a not-shown light receiving means such as a phototransistor are provided so as to be opposite to each other through the outer edge portion of the slit plate 17.

In the steering angle sensor 13, the phototransistor receives light from the light-emitting diode through the slits 15 of the slit plate 17 which rotates in accordance with the steering of a steering wheel, and this light passing through the slits is converted into current pulses and counted by a counter or the like so as to detect the rotation angle of the steering wheel.

However, in the above-mentioned conventional column structure, the SRC 7 is attached to the upper side of the column switch 1 while the steering angle sensor 13 is attached to the lower side of the column switch 1. Therefore, there has been a problem that the size H in the direction of the steering shaft of the column switch 1 is increased, so that it is necessary to ensure a large on-vehicle size for the column switch 1.

In addition, two electric equipments respectively constituted by a rotating body and a fixed body are provided on the same shaft of a steering shaft, so that similar parts are disposed doubly. Therefore, there has been a problem that the number of parts is increased.

SUMMARY OF THE INVENTION

Taking the foregoing problems into consideration, it is an object of the present invention to provide a connector with a steering angle sensor in which the height in the direction of the steering shaft of a column switch can be reduced, and the number of parts can be also reduced, and a column structure using such a connector.

In order to attain the foregoing object, according to the present invention, provided is a steering roll connector with a steering angle sensor, comprising an outer cylinder as a fixed body, an inner cylinder as a rotating body provided inside the outer cylinder concentrically therewith, an annular storage chamber formed between the outer cylinder and the inner cylinder, and a spiral cable stored in the storage chamber, one end of the cable being supported on the outer cylinder while the other end of the cable is supported on the inner cylinder; characterized by further comprising a disk fixed on the inner cylinder concentrically therewith, a plurality of slits circumferentially formed in an outer edge portion of the disk, and a sensor portion provided in a column switch and including a light receiving means and a light emitting means which are disposed so as to be opposite to each other through the outer edge portion of the disk.

In addition, a column structure according to the present invention is provided with the above connector with a steering angle sensor which is characterized in that the outer cylinder is formed integrally with a column switch body.

Further, the column structure may be characterized in that a squib-connection connector is provided in the disk, and the other end of the cable supported on the inner cylinder is connected to the squib-connection connector.

In the thus configured connector with a steering angle sensor, the outer cylinder and the inner cylinder are connected to each other by the spiral cable so as to not only provide an essential function as a cable-type electric connection device for highly reliably supplying electricity to the inner cylinder as a rotating body, but also to provide another function as a steering angle sensor for detecting the rotation angle of a steering wheel by providing a disk fixedly to the inner cylinder concentrically therewith so that the number of the slits provided through the outer edge portion of the disk is counted in the sensor portion.

In the column structure according to the present invention, the connector with a steering angle sensor having both the SRC function and the steering angle sensor function is provided in the column switch. Accordingly, it is not necessary to provide an SRC and a steering angle sensor separately as in a conventional structure, so that the height in the steering shaft direction of the column switch can be reduced correspondingly to the steering angle sensor which becomes unnecessary.

In addition, the outer cylinder is formed integrally with the column switch body. Accordingly, it is not necessary to form a separate outer cylinder.

Further, being provided on the disk, the squib-connection connector can be connected directly to a squib terminal on the steering side.

DETAILED DESCRIPTION OF THE INVENTION

Preferred embodiments of a connector with a steering angle sensor and a column structure using the same according to the present invention will be described in detail below with reference to the drawings.

Figure 1:
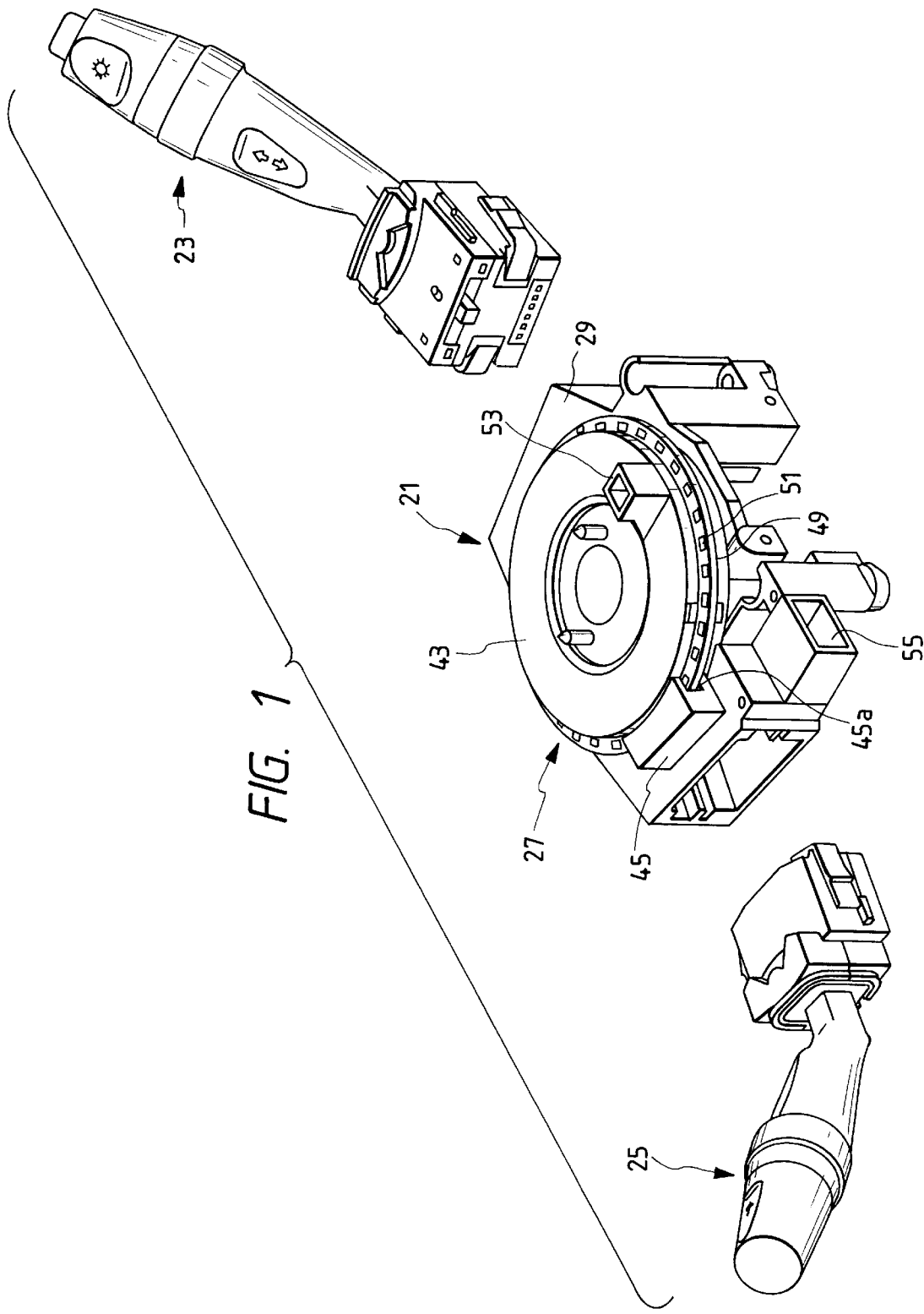
FIG. 1 is a perspective view of a column structure using a connector with a steering angle sensor according to the present invention.
Figure 2:
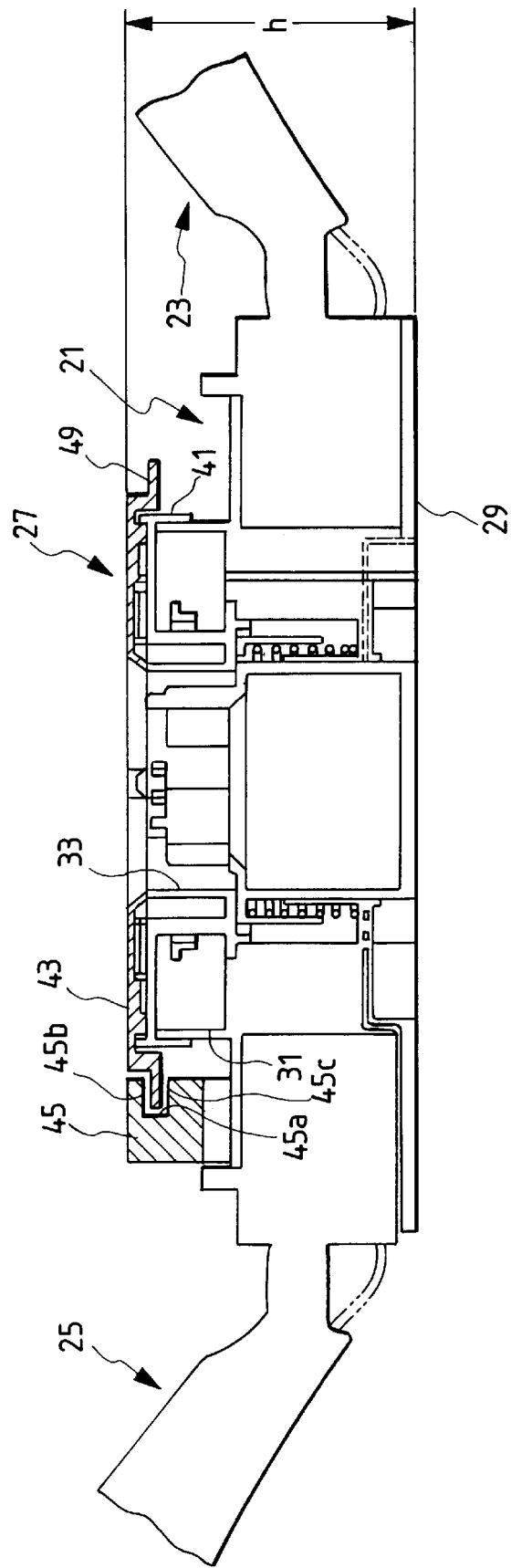
FIG. 2 is a sectional view of FIG. 1.
Figure 3:
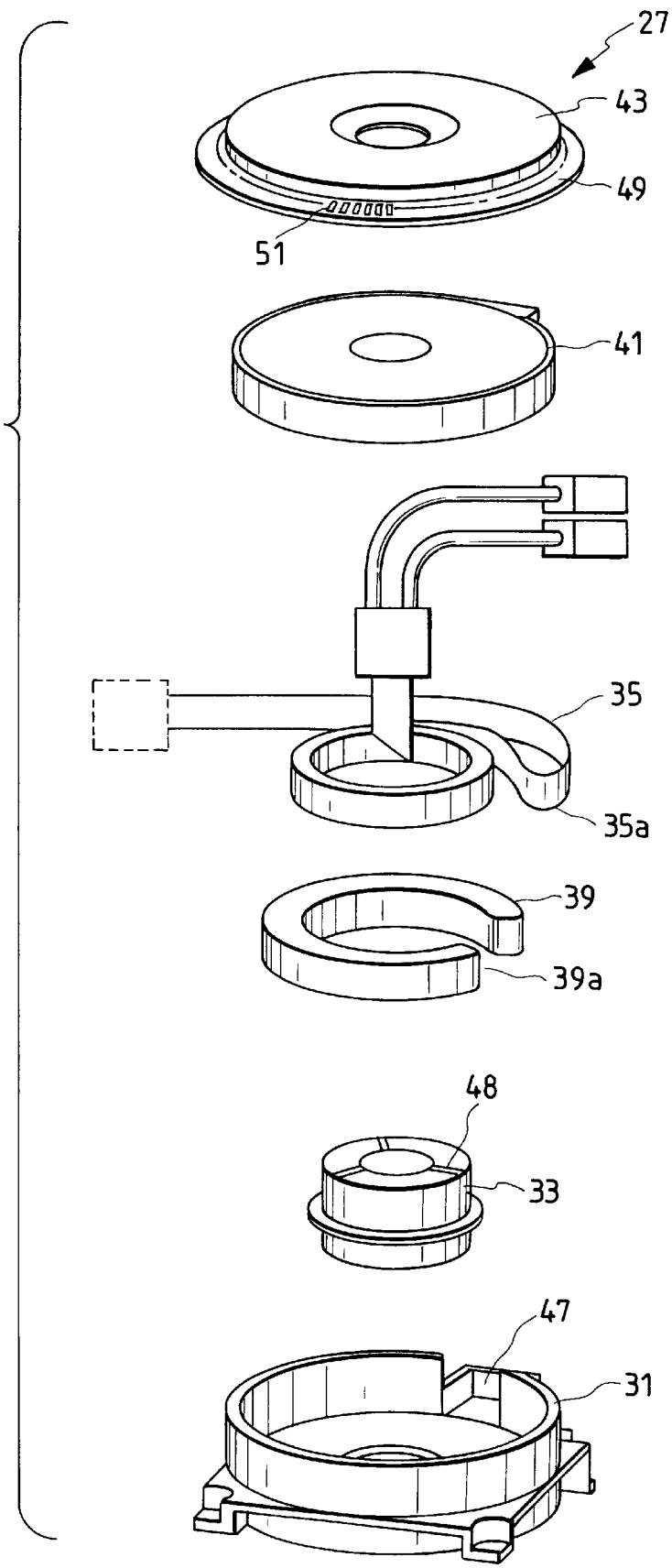
FIG. 3 is an exploded perspective view of the connector with a steering angle sensor shown in FIG. 1.
Figures 4, 5:
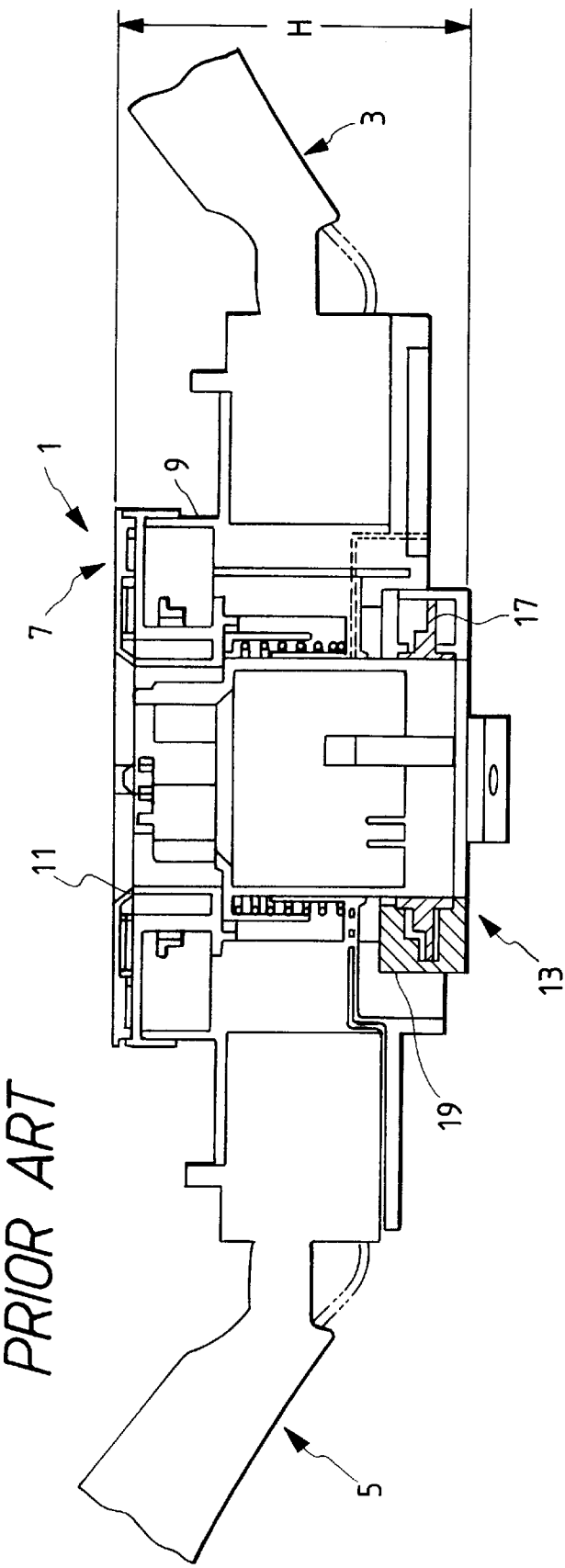
FIG. 4 is a sectional view of a conventional steering column portion provided with an SRC and a steering angle sensor.
FIG. 5 is a perspective view of a slit plate of the steering angle sensor.

FIG. 1 is a perspective view of a column structure using a connector with a steering angle sensor according to the present invention, FIG. 2 is a sectional view of FIG. 1, and FIG. 3 is an exploded perspective view of the connector with a steering angle sensor shown in FIG. 1. A turn signal and head lamp switch lever 23 and a wiper control switch lever 25 are provided on the outer circumference of a steering column switch (column switch) 21 through a steering shaft (not-shown). A connector with a steering angle sensor 27 is provided on the upper side of the column switch 21 (on the upper side of FIG. 2).

As shown in FIG. 3, the connector with a steering angle sensor 27 is constituted by an outer cylinder (under cover) 31 formed integrally with a column switch body 29, an inner cylinder (rotator) 33 rotating in the inside of the under cover 31, a cable (FFC) 35 stored spirally between the under cover 31 and the rotator 33, a C-ring carrier 39 which not only encloses the outer circumferential portion of the cable 35 but also divides and opens the outer circumferential portion in the radial direction, a cover 41 fitting to the under cover 31 and storing the cable 35, a disk (upper cover) 43 rotating integrally with the rotator 33 on the upper surface of the cover 41, and a sensor portion 45 (see FIGS. 1 and 2) provided in the column switch body 29.

A lead-out portion 47 for taking out one end of the cable 35 is formed in the under cover 31. The under cover 31 is not always formed integrally with the column switch body 29 as described above, but it may be formed separately from the column switch body 29 and attached to the column switch body 29 by means of a rivet or the like.

The rotator 33 is rotatably provided in the inside of the under cover 31 concentrically therewith, and attached to the outer circumference of the steering shaft so that the rotator 33 cannot rotate relatively to the steering shaft. A holding groove 48 cut radially is formed in the rotator 33, for holding the other end of the cable 35. In addition, the lower end, not shown, of the rotator 33 projects downward from the under cover 31. A protrusive canceler projecting radially is provided in the outer circumference of this projecting portion of the rotator 33. Rotating integrally with a steering wheel, the rotator 33 brings the canceler into contact with a cam of a not-shown canceling mechanism so as to return the turn signal and head lamp switch lever 23 to its neutral position through this cam.

The carrier 39 is disposed between the one end of the cable 35 wound in the inside of the under cover 31 and the other end of the cable 35 wound on the rotator 33 so as to make a winding-direction turn-over portion 35a of the cable 35 pass through a divided portion 39a. This carrier 39 eliminates looseness appearing in the cable 35 when the rotator 33 rotates so as to make the winding and feeding of the cable 35 smooth.

A collar portion 49 is provided in the outer edge portion of the upper cover 43, and a plurality of slits 51 are provided in the collar portion 49 circumferentially. That is, the upper cover 43 is constituted by a conventional upper cover and a conventional slit plate which are formed integrally with each other. In addition, a squib-connection connector 53 (see FIG. 1) is provided on the upper surface of the upper cover 43. The other end of the cable 35 held in the holding groove 48 is connected to the squib-connection connector 53. The squib-connection connector 53 fits to a squib terminal (not shown) on a steering wheel directly when the steering wheel is attached to the steering shaft.

A sensor portion 45 is provided on the upper surface of the column switch body 29. The housing of the sensor portion 45 is formed integrally with the column switch body 29. The sensor portion 45 may be formed separately from the column switch body 29 and then attached thereto. A slit detection groove 45a is provided in the sensor portion 45. A light emitting means 45b such as a light-emitting diode and a light receiving means 45c such as a phototransistor are provided in the inside of the sensor portion 45 so as to be opposite to each other through the slit detection groove 45a. The sensor portion 45 is disposed in the column switch body 29 so as to hold the collar portion 49 of the upper cover 43 in the inside of the slit detection groove 45a.

In addition, a collective connector 55 is formed integrally with the column switch body 29. Respective electric circuits for the turn signal and head lamp switch lever 23, the wiper control switch lever 25, the cable 35 taken out from the under cover lead-out portion 47, and the sensor portion 45 are collectively connected to the collective connector 55.

In the thus configured connector with a steering angle sensor 27, electricity can be supplied to the rotator 33 as a rotating body with a high reliability by connecting the under cover 31 to the rotator 33 through the spiral cable 35.

In addition, the rotation angle of a steering wheel can be detected by providing the collar portion 49 in the upper cover 43 rotating integrally with the steering wheel, providing the slits 51 in the collar portion 49, receiving light from the light-emitting diode by the phototransistor through the slits 51 of the collar portion 49 rotating in accordance with the steering wheel, converting this light passing through the slits 51 into current pulses, and counting the pulses by a counter or the like.

In the column structure using the connector with a steering angle sensor 27, since the connector with a steering angle sensor 27 having both the SRC function and the steering angle sensor function is provided on the upper side of the column switch 21, it is not necessary to provide an SRC and a steering angle sensor on the upper and lower sides of a column as in a conventional structure. Accordingly, the size "h" in the steering shaft direction of the column switch 21 can be reduced by the unnecessary steering angle sensor in comparison with a conventional structure (h<H).

Further, not only a slit plate is integrated with the upper cover 43, but also the under cover 31 is formed integrally with the column switch body 29. Accordingly, it is not necessary to provide an under cover separately.

In addition, since the squib-connection connector 53 is formed in the upper cover 43, it is possible to connect directly to a squib terminal on the steering side.

In addition, respective electric circuits for the turn signal and head lamp switch lever 23, the wiper control switch lever 25, the cable 35, and the sensor portion 45 are collectively connected to the collective connector 55. Accordingly, the connectors used respectively correspondingly to these parts can be united into one.

As has been described, according to the above-described connector with a steering angle sensor 27, because the upper cover 43 rotating in accordance with a steering wheel is used, and the slits 51 formed in this upper cover 43 can be detected in the sensor portion 45, not only it is possible to supply electricity to the steering wheel as an essential function of an SRC, but also it is possible to detect the rotation angle of the steering wheel at the same time.

In addition, according to the above-described column structure, by using the connector with a steering angle sensor 27, a separate steering angle sensor which has been provided concentrically with an SRC conventionally is not necessary. Accordingly, the size "h" in the direction of the steering shaft of the column switch 21 can be reduced correspondingly to the omitted steering angle sensor in comparison with a conventional structure.

Further, a slit plate which has been conventionally formed separately from the upper cover 43 is integrally formed with the upper cover 43, and the under cover 31 are formed integrally with the column switch body 29. Accordingly, it is possible to reduce the number of parts.

Since the squib-connection connector 53 is provided in the upper cover 43 so as to be connected directly to a squib terminal on the steering side, a wire harness is not necessary, and the squib-connection connector 53 can be fitted at the same time when a steering wheel is attached. Accordingly, the number of steps of working can be reduced.

In addition, the collective connector 55 is provided in the column switch body 29, and connectors which have been respectively individually provided in the circuits conventionally are collected in the collective connector 55. Thus, the connectors can be united into one, so that the number of parts can be further reduced, and the number of working steps can be further reduced.

Although the squib-connection connector 53 is provided integrally with the upper cover 43 in the above-described connector with a steering angle sensor 27, the squib-connection connector 53 may be connected to a wire harness led out of the upper cover 43, and provided separately from the upper cover 43.

In addition, the carrier 39 is not necessarily required to be provided in the inside of the connector with a steering angle sensor 27.

Further, not to say, the rotator 33 of the connector with a steering angle sensor 27 may be formed separately from the canceler.

As has been described above in detail, in the connector with a steering angle sensor according to the present invention, because a disk which rotates in synchronism with a steering wheel is used, slits are provided in this disk, and the slits are detected in a sensor portion, not only it is possible to supply electricity to the steering wheel as an essential function of an SRC, but also it is possible to detect the rotation angle of the steering wheel at the same time.

In the column structure according to the present invention, such a connector with a steering angle sensor having both the SRC function and the steering angle sensor function is provided in a column, so that it is not necessary to provide a steering angle sensor and it is therefore possible to reduce the height in the steering shaft direction of the column correspondingly to the steering angle sensor which has become unnecessary.

In addition, an outer cylinder is formed integrally with a column switch body. Accordingly, it is not necessary to form a separate outer cylinder, so that the number of parts can be reduced.

Further, a squib-connection connector is formed in a disk, so that the squib-connection connector can be connected directly to a squib terminal on the steering side. Accordingly, the squib-connection connector can be fitted at the same time when a steering wheel is attached, so that the number of steps of working can be reduced.

What is claimed is:

1. A connector with a steering angle sensor, comprising:

an outer cylinder as a fixed body;

an inner cylinder as a rotating body provided inside said outer cylinder concentrically therewith;

an annular storage chamber formed between said outer cylinder and said inner cylinder;

a spiral cable stored in said annular storage chamber, one end of said cable being supported on said outer cylinder while the other end of said cable being supported on said inner cylinder;

an upper cover fixed on said inner cylinder concentrically therewith;

a slit plate attached to said upper cover, said slit plate including a plurality of slits circumferentially formed in an outer edge portion of said slit plate; and a sensor portion including a light receiving means and a light emitting means which are disposed so as to be opposite to each other through said outer edge portion of said slit plate.

2. A column structure, comprising:

a connector with a steering angle sensor recited in claim 1; and a column switch body, said outer cylinder and said sensor portion being attached to said column switch body.

3. A column structure as claimed in claim 2, wherein said column switch body is integrated with said outer cylinder and said sensor portion.

4. A column structure as claimed in claim 2, further comprising a squib-connection connector disposed on said upper cover, the other end of said cable supported on said inner cylinder being connected to said squib-connection connector.

5. A connector as claimed in claim 1, wherein said upper cover is attached to a top surface of said inner cylinder.

6. A connector as claimed in claim 1, wherein said slit plate and said upper cover are integrated.

7. A connector as claimed in claim 1, wherein said upper cover and said slit plate are both provided on only one side of said annular storage chamber.

8. A connector as claimed in claim 7, wherein said upper cover and said slit plate are both provided on a top portion of said connector above said annular storage chamber.

9. A column structure as claimed in claim 2, wherein said slit plate and said sensor portion are provided on an upper side of said column switch body.

10. A steering roll connector comprising:

an outer cylinder;

an inner cylinder provided inside said outer cylinder concentrically therewith, said inner cylinder including a holding groove;

an annular storage chamber formed between said outer cylinder and said inner cylinder;

a cable stored spirally in said annular storage chamber, one end of said cable being supported by said outer cylinder and another end of said cable being supported by said holding groove;

a C-ring carrier circumscribing a portion of said cable;

a cover disposed on an upper portion of said outer cylinder, said cover defining an upper surface of said annular storage chamber;

an upper cover adjacent to said cover, said upper cover being fixed on said inner cylinder concentrically therewith;

a slit plate attached to said upper cover, said slit plate including a plurality of equally spaced slits formed in an outer edge portion of said slit plate; and a squib-connection connector disposed on an upper surface of said upper cover, wherein said another end of said cable held in said holding groove is connected to said squib-connection connector, wherein said inner cylinder rotates relative to said outer cylinder, and wherein said slit plate is adapted to be used in conjunction with a sensor portion including a light receiving means and a light emitting means disposed opposite to one another through said outer edge portion of said slit plate, thereby allowing measurement of a degree of rotation of said slit plate relative to said outer cylinder.

11. A steering roll connector according to claim 10, wherein said outer cylinder is formed integrally with a column switch body.

12. A steering roll connector according to claim 11, wherein said sensor portion is disposed on an upper surface of said column switch body and wherein said plurality of equally spaced slits are constrained to move between said light emitting means and said light receiving means.

* * * * *